United States Patent

Whitley

[11] 3,892,061
[45] July 1, 1975

[54] DEFOLIATOR MECHANISM

[76] Inventor: Andrew Whitley, Highway 64, Zebulon, N.C. 27597

[22] Filed: Dec. 18, 1972

[21] Appl. No.: 315,907

[52] U.S. Cl. ..................... 56/27.5; 56/126; 56/330
[51] Int. Cl. ........................................... A01d 45/16
[58] Field of Search ........... 56/27.5, 126, 130, 330, 56/33, 328 R

[56] References Cited
UNITED STATES PATENTS

| | | | |
|---|---|---|---|
| 2,696,069 | 12/1954 | Hawkins | 56/27.5 |
| 2,834,173 | 5/1958 | Wilson | 56/27.5 |
| 2,874,528 | 2/1959 | Esch | 56/126 |
| 3,475,888 | 11/1969 | Staats, Sr. et al. | 56/328 R |
| 3,507,103 | 4/1970 | Pickett et al. | 56/27.5 |
| 3,568,419 | 3/1971 | Creager | 56/126 X |
| 3,590,566 | 7/1971 | Cutts, Sr. et al. | 56/330 |

Primary Examiner—Louis G. Mancene
Assistant Examiner—J. N. Eskovitz

[57] ABSTRACT

In abstract, a preferred embodiment of this invention is an improved mechanical defoliating device, particularly adapted for use in the priming of tobacco leaves from their stalks. This improved defoliator can be used with any type of harvester or mobile frame, whether tractor mounted, tractor pulled or self-propelled. The defoliator mechanisms themselves can either be driven by power from the mobile frame or by independent power sources such as electric or hydraulic motors. The defoliator mechanisms are constructed of relatively hard material such as metal for durability and yet have fingers that are flexible to more readily adapt to varying plant sizes and conditions.

8 Claims, 3 Drawing Figures

DEFOLIATOR MECHANISM

This invention relates to harvesting devices and more particularly to defoliator mechanisms for removing the leaves from stalk type plants.

In the past, various attempts have been made to provide defoliator mechanisms for removing leaves from stalk type plants, particularly tobacco plants. Examples of these earlier attempts are disclosed in U.S. Pat. Nos. 2,834,173 to Wilson, 2,834,174 to Suggs, et al., and 3,093,949 to Splinter. None of the prior known defoliator mechanisms have long durability and yet accomplish complete defoliation in the areas of the stalk being primed. Also none of the prior known defoliator mechanism have proved more than partially successful in removing leaves from the upper portions of stalks due to the limberness of such stalks in this area.

After much research and study into the above mentioned problems, the present invention has been developed to provide an extremely durable yet flexible and thus adaptable defoliating mechanism which not only is extremely efficient in leaf removal in the lower portions of the stalk but is equally effective in the limber upper portions thereof. The defoliator of the present invention likewise does not damage and mutilate the leaves as they are removed from stalks as many of the prior known devices have.

In view of the above, it is an object of the present invention to provide an improved defoliator mechanism constructed of relatively hard, durable material with flexible fingers for more complete and uniform stripping of the leaves from a plant.

Another object of the present invention is to provide a defoliating mechanism that is adaptable for use either on tractor mounted, trailer mounted or self-propelled harvesters.

Another object of the present invention is to provide a harvester defoliator mechanism including loose footed, spring-like fingers for engaging the plant stalk and stripping the leaves therefrom.

A further object of the present invention is to provide, in a defoliating mechanism, loose footed defoliating fingers disposed generally parallel to the longitudinal axis of said mechanism.

An additional object of the present invention is to provide a defoliating mechanism including a finger or wiper means so configurated as to remove leaves from all sides of a plant stalk.

Another object of the present invention is to provide an improved defoliating mechanism for harvester devices including means for removing leaves from all points, 360° about the stalk.

Other objects and advantages of the present invention will become apparent and obvious from a study of the following description and the accompanying drawings which are merely illustrative of such invention. In the drawings.

Figure 1:
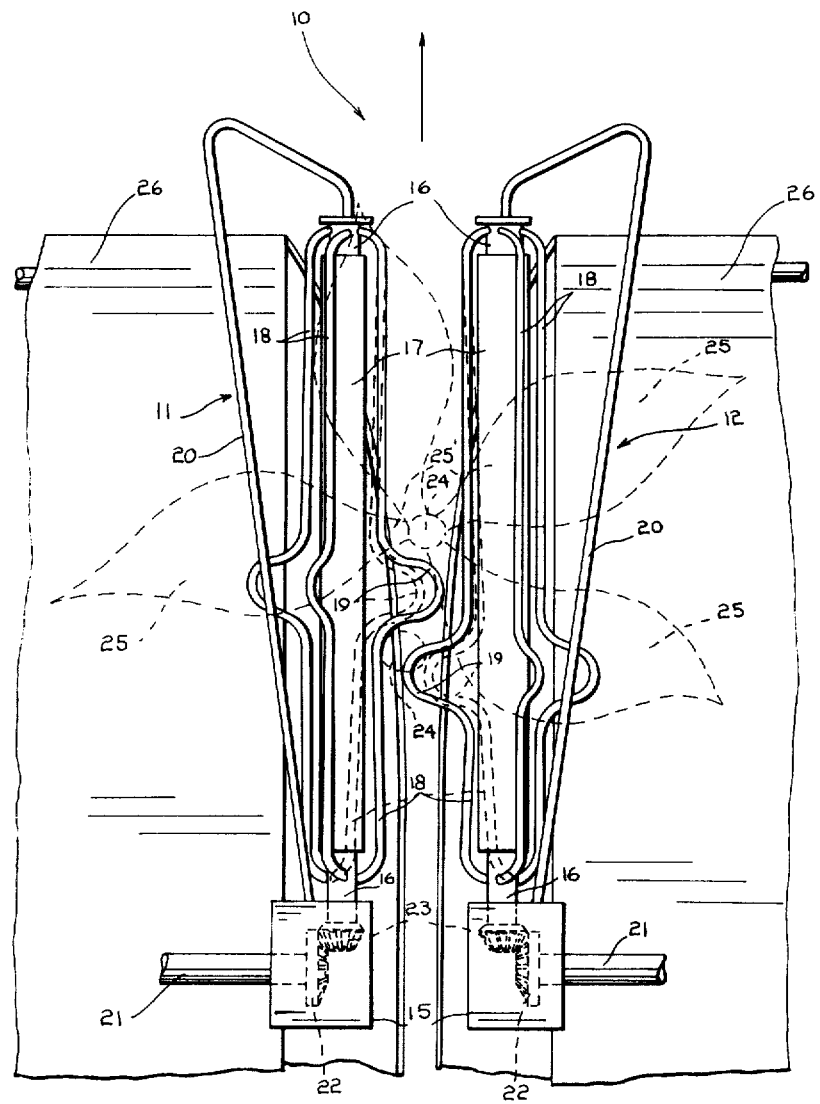
FIG. 1 is a top plan view of the defoliator mechanism of the present invention.

With further reference to the drawings, the defoliator indicated generally at 10 of the present invention includes a pair of adjacently disposed defoliating members indicated generally at 11 and 12. Each of these members is supported by means such as bracket 14 which is connected to the frame of a harvester (not shown) such as that disclosed in my copending application, Ser. No. 295,711, filed Oct. 6, 1972, entitled Improved Tobacco Primer.

Bracket 14 is fixedly secured to drive housing 15. Rotatively extending from housing 15 is shaft 16. Along a portion of this shaft is a cushioning sleeve 17 of rubber or other resilient material. This prevents the relatively fragile stalk of the plants from becoming bruised or otherwise damaged by coming into contact with shaft 16 during the harvesting operation as will hereinafter be described in more detail.

To the forward or opposite end of shaft 16 from housing 15 are fixedly secured a plurality of resilient defoliator members 18. Each of these members extends back toward housing 15 generally parallel to shaft 16 but is not connected to such shaft at the opposite ends thus forming what can be described as loose footed wipper members. It therefore can be readily seen, as clearly illustrated in FIG. 1, that members 18 can be depressed toward shaft 16 as necessary and yet will return to a spaced relation therefrom when pressure is removed.

Each of the defoliating members 18 disposed about shaft 16 includes a ripple or U-shaped bend. Since these outwardly extending bends are off-set relative to adjacently disposed defoliating mechanism 11 and 12 as seen clearly in FIG. 1, removal or defoliation all the way around the stalk being primed can be accomplished.

To help support the outer most end of shaft 16 from housing 15 and also to assure depression of the leaves prior to their coming into contact with the defoliating members, a guide 20 is provided. The inner end of this guide is fixedly secured to housing 15 and extends outwardly therefrom. The opposite end thereof turns back inwardly toward such housing and is secured to the outer end of shaft 16 in such a manner that such shaft can rotate relatively to the guide.

To drive, in an inwardly and downwardly direction, the defoliator mechanisms 11 and 12, a rotative power source such as mechanical, electrical or hydraulic means can be used. The mechanical means shown includes a drive shaft 21 having a bevel gear 22 fixedly secured to one end thereof. This gear meshingly engages bevel gear 23 which is fixedly secured to the inter end of rotatable shaft 16. Shaft 21 can be rotatively driven by any convenient means such as the power sources disclosed in my copending application hereinabove identified.

Drives other than the above described mechanical drive can, of course, be used and includes, but not limited, to a standard hydraulic motor operatively mounted within each housing 15 to drive its respective shaft 16. Likewise, a standard electric motor could be operatively housed within the enclosure 15. Of course, even other mechanical drive means such as flexible cables could be used but regardless of the power source or its form, the end result would be the same, namely, the rotative drive of shaft 16 and its loose footed, flexible defoliating members 18.

Figure 3:
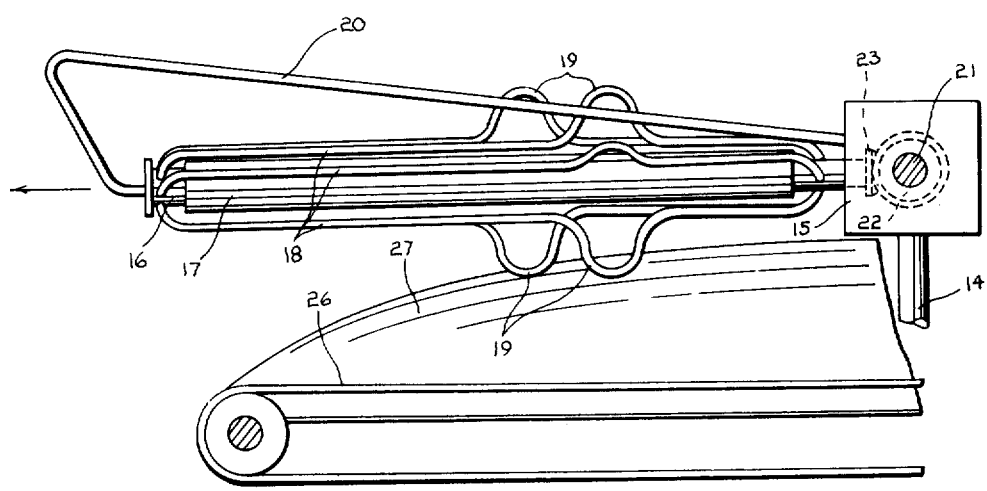
FIG. 3 is a side elevational view of the same.

In actual use of the defoliator of the present invention, the same is moved in a forwardly direction across the ground as indicated by the arrows in FIGS. 1 and 3. Because the crop being harvested is planted in the ground, the relative movement of the plants, such as tobacco stalk 44, through the device is in the opposite direction from the arrows. As the stalk is approached, guides 20, which are tapered inwardly at their forward ends, not only guide such stalk into the area between the adjacent defoliator mechanisms 11 and 12 but also engage the upwardly growing leaves and depressingly guide the same into contact with the defoliating members 18.

Figure 2:
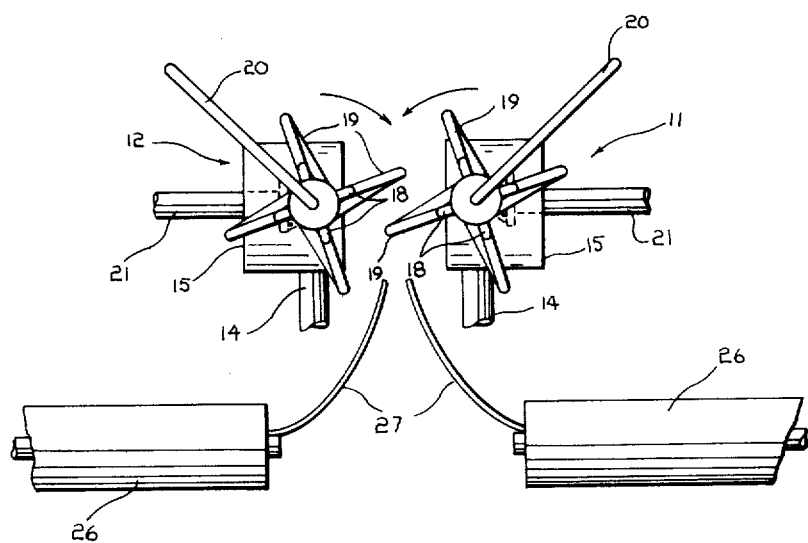
FIG. 2 is a front plan view of such defoliator.

Because the defoliator mechanisms are rotating in opposite directions inwardly and downwardly as indicated by the arrows in FIG. 2, the leaves 25 are tended to be pressed downwardly at their stem portions 25'. Many of the leaves, particularly those outwardly extending on the sides of the stalks next to the defoliator mechanisms, will tend to be removed by the downward motion of the defoliator members 18. As the relative movement of the stalk through the defoliator brings it into contact with the first bend or bulging portion, the leaves on one of the two sides thus far undefoliated will be wipingly removed. As the stalk continues its relatively movement, the defoliating members 18 will resiliently depress to the approximate position shown in dotted lines in FIG. 1 so that such stalk can move on past the bulging portion. The moving stalk thereafter engages the bulging portion of the adjacent defoliator mechanism thus removing the leaves from the remaining side or area of the stalk 24.

As the leaves 25 are broken or wiped from the stalk 24, they are removed from the defoliation area. Any convenient means will be adequate for this purpose such as conveyor belts 26 which can be similar to those shown and described in my presently copending application hereinabove identified.

If conveyors of the type shown are used, deflectors such as that shown at 27 can be mounted in the area immediately below the defoliating mechanism to prevent the leaves from falling in the area between the conveyor belts and thus being lost.

It is understood, of course, that other conveying means than that shown can be used such as differently arranged mechanical conveyors, hand removal, or means such as pneumatic type devices.

Although relatively straight, longitudinally parallel defoliator members are disclosed, it is contemplated that these could be at least slightly helically disposed about shaft 16. Also two or more alternately outwardly projecting bends relative to the adjacently disposed defoliator mechanism can be used which would give the defoliating members a ripple effect to more positively remove all leaves from the area of the stalk being processed. It is even further contemplated that the defoliator mechanisms of the present invention can be disposed at a slight forward and high positioned relative to the ground being traversed so that a greater length of stalk can be defoliated.

From the above, it is obvious that the present invention has the advantage of a relatively simple yet extremely efficient defoliating means for harvesters, particularly tobacco type harvesters. Another advantage of the present invention is that it provides, in an automatic type tobacco cropper, a device for defoliating the tobacco plant without cutting or otherwise mutilating the leaves being removed. Another advantage of the present invention is that leaves growing at any point, 360° around the cross section circumference of the stalk, can be removed. An even greater advantage of the present invention is that it can be used in conjunction with any standard type automatic cropping machine without substantial change or modification.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A defoliating means for removing the leaves from at least a portion of the stalk of a row of plants comprising: a support means moveable along a predetermined path adjacent the row of plants; a rotatable means rotatively mounted to said support means; at least one finger-like elongated, resilient defoliating member fixedly secured at one end only to said rotatable means and extending therefrom where to other end is unsupported and held in cantilever fashion such that said finger-like defoliating member may flex and move independently of said rotative means as said defoliating member engages leaves on respective plants during the defoliating operation, wherein said rotative means with associated defoliating members are disposed in lateral spaced apart relationship and wherein a plurality of said defoliating members are circumferentially spaced about each rotative means, each defoliating member being of a single piece construction and spaced outwardly from the axis of rotation of the rotative means supporting the respective defoliating member such that an open space lies between each defoliating member and the rotative means supporting the respective defoliating member; and means to rotatively drive said rotatable means whereby said defoliating member can engage and remove leaves from the stalks of the plants as said support moves therepast.

2. The defoliating means of claim 1 including a guide means operatively associated with said defoliating means whereby leaves can be guided into correct position for defoliation.

3. The defoliating means of claim 1 wherein the means to rotatively drive said rotatable means is an electric type motor.

4. The defoliating means of claim 1 wherein at least a portion of the defoliating members include an outwardly extending bend portion whereby leaves on all sides of the stalk portion being processed can be removed therefrom.

5. The defoliating means of claim 4 wherein loose leaf conveyor means are provided adjacent said rotatable means.

6. The defoliating means of claim 5 wherein the conveyor means is a belt type conveyor.

7. The defoliating means of claim 1 wherein the means to rotatively drive said rotatable means is a mechanical drive.

8. The defoliating means of claim 1 wherein the means to rotatively drive said rotatable means is a hydraulic type motor.

* * * * *